Figure 1:
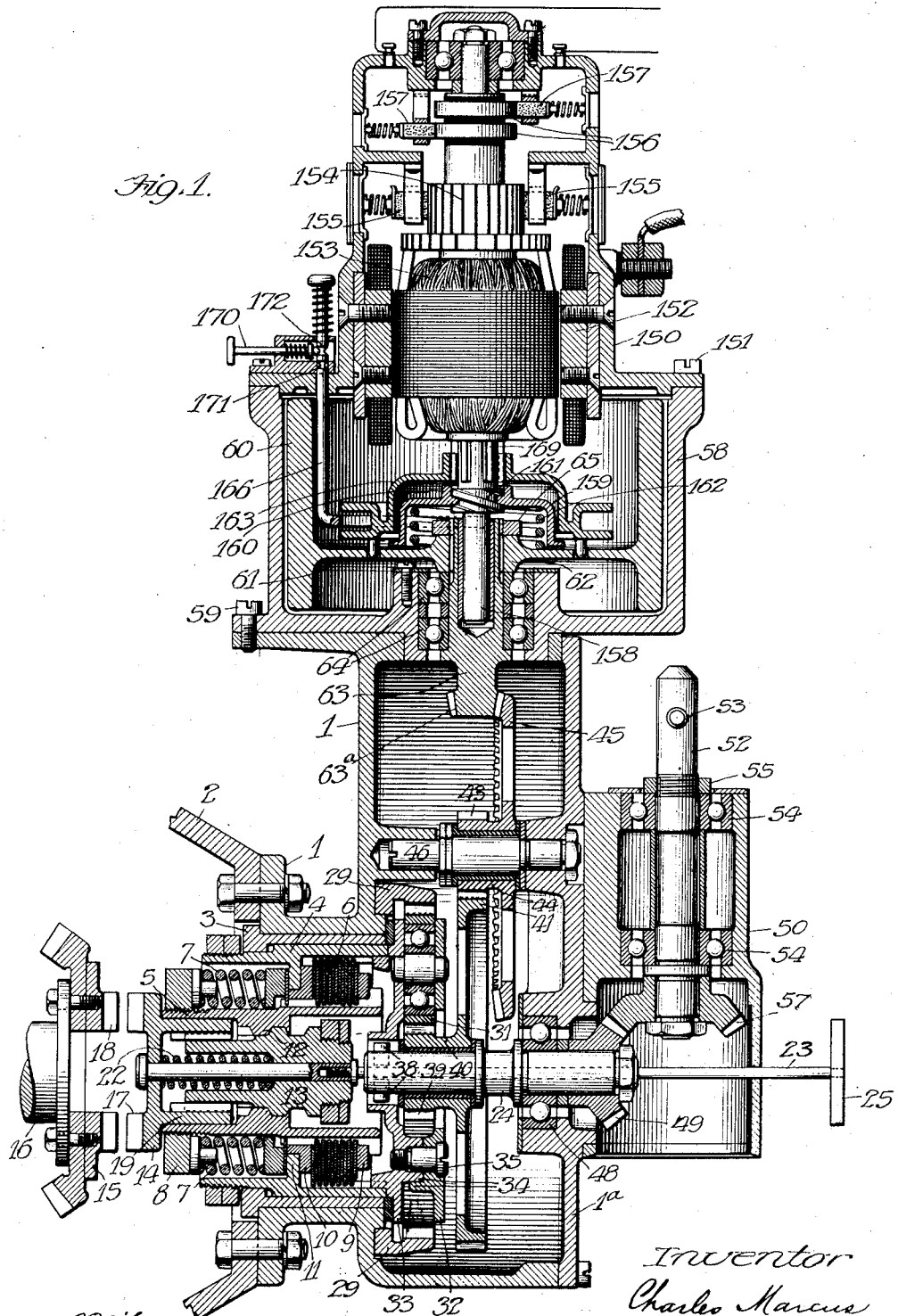

Sept. 2, 1930.  C. MARCUS  1,774,804
ENGINE STARTER
Filed Nov. 21, 1925  4 Sheets-Sheet 1

Witness
Martin H. Olsen

Inventor
Charles Marcus
By Rector, Hibben, Davis & Macauley
His Attys.

Sept. 2, 1930.  C. MARCUS  1,774,804
ENGINE STARTER
Filed Nov. 21, 1925  4 Sheets-Sheet 2
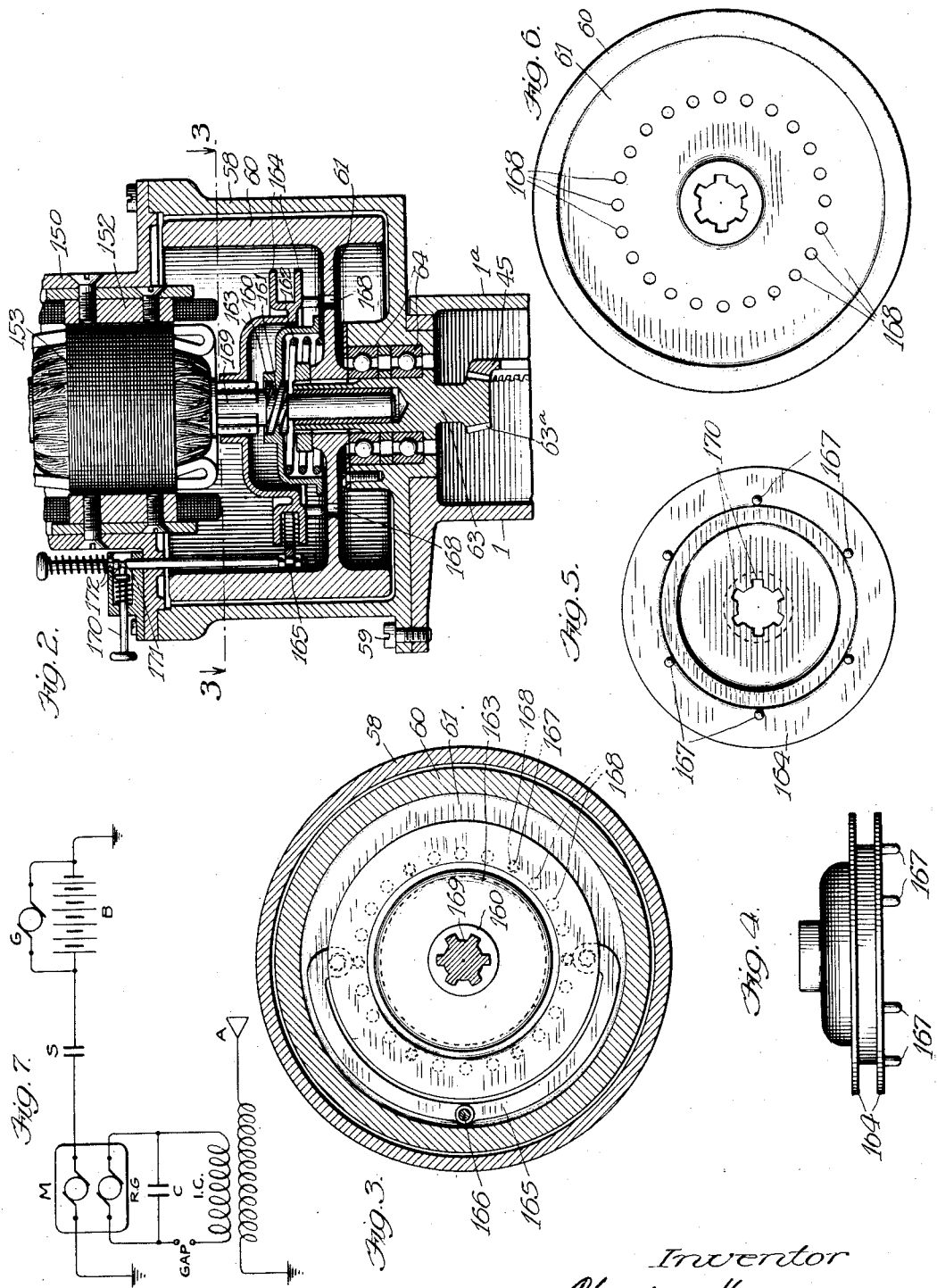

Sept. 2, 1930.  C. MARCUS  1,774,804
ENGINE STARTER
Filed Nov. 21, 1925   4 Sheets-Sheet 3
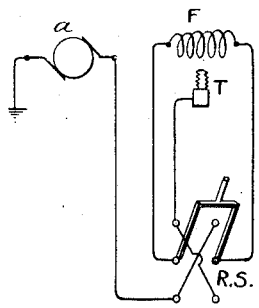
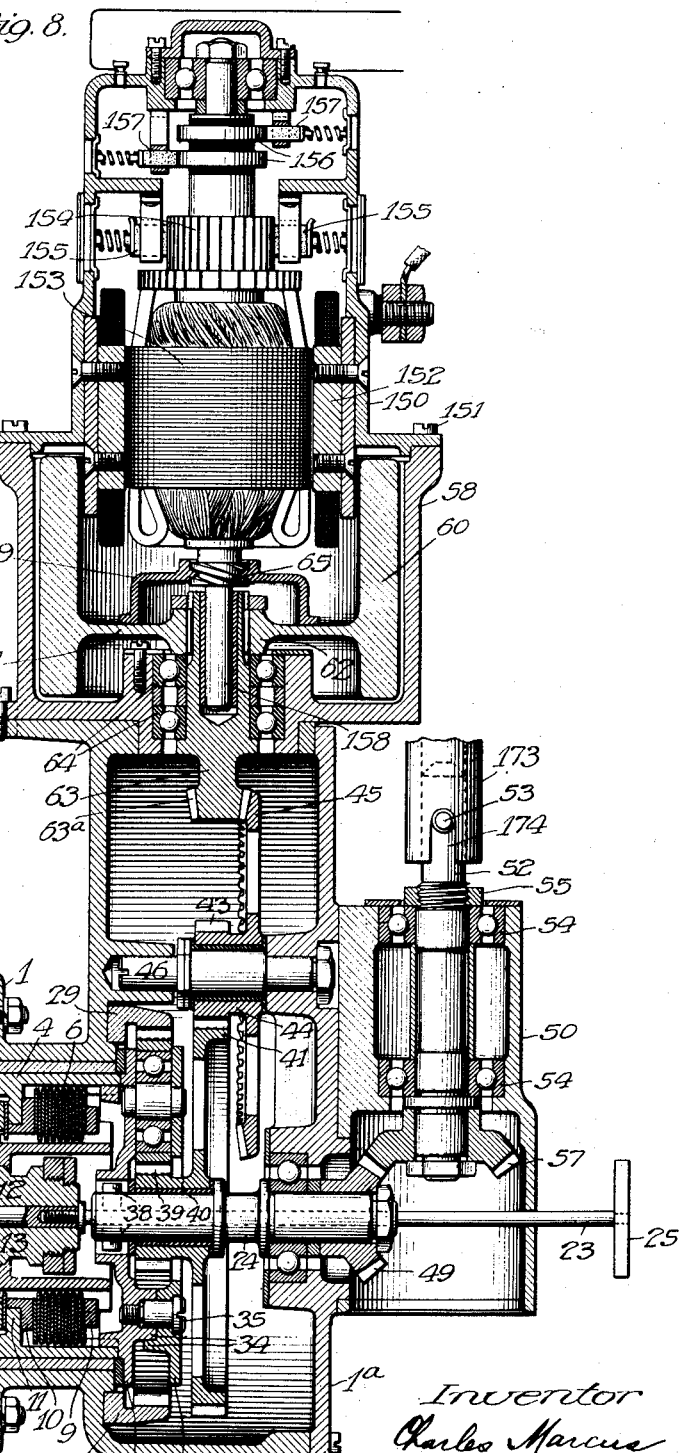

Sept. 2, 1930. C. MARCUS 1,774,804
ENGINE STARTER
Filed Nov. 21, 1925 4 Sheets-Sheet 4
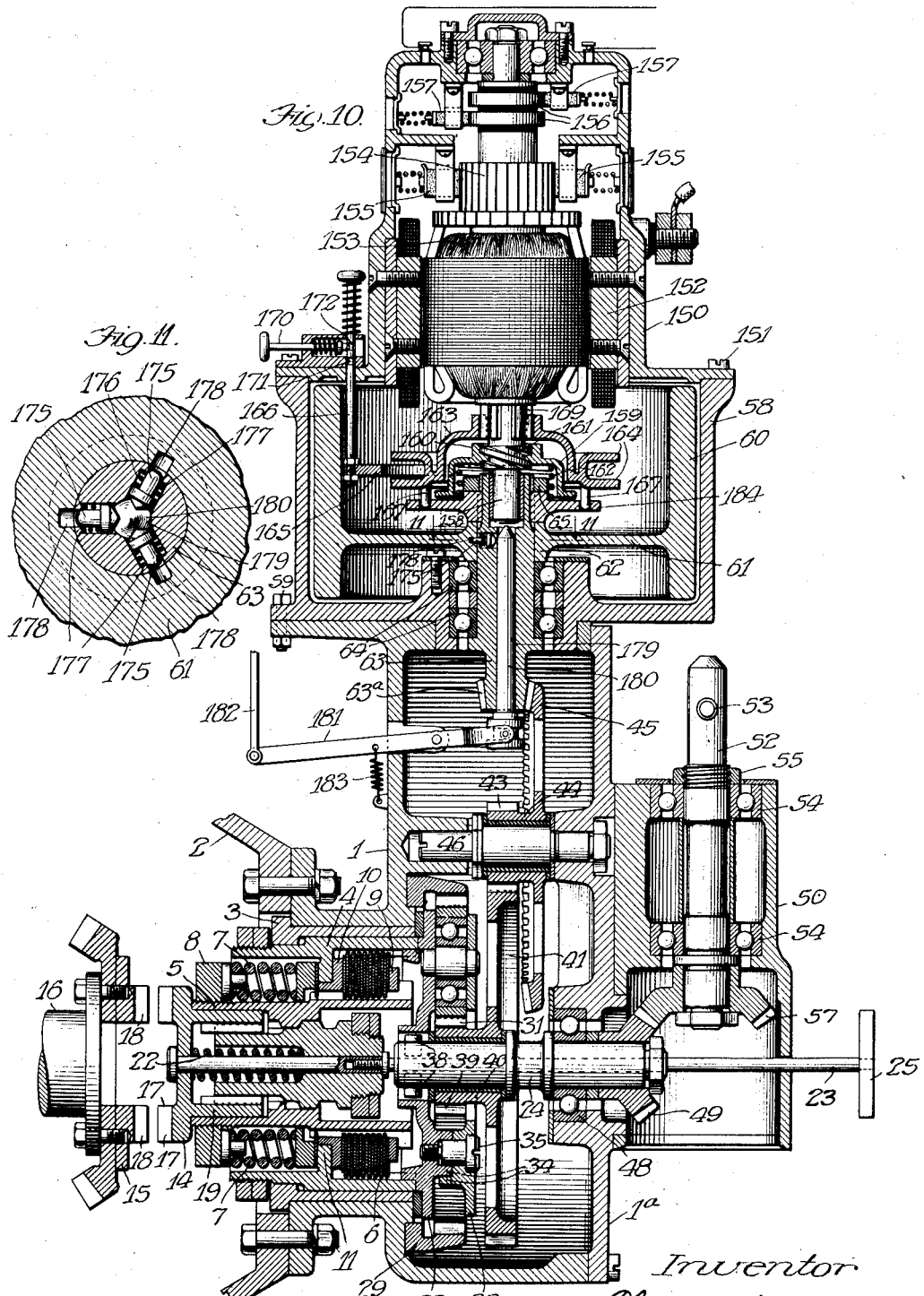

Patented Sept. 2, 1930

1,774,804

UNITED STATES PATENT OFFICE

CHARLES MARCUS, OF NEW YORK, N. Y., ASSIGNOR TO ECLIPSE MACHINE COMPANY, OF ELMIRA, NEW YORK, A CORPORATION OF NEW YORK

ENGINE STARTER

Application filed November 21, 1925. Serial No. 70,522.

My invention relates to engine starting apparatus for the starting of engines, such as internal combustion engines, and more particularly, but not necessarily, airplane engines, and the object thereof is to provide a simple, efficient and reliable apparatus capable of either manual operation as by hand cranking or of power operation by means of a prime mover such as an electric motor, such operations being conducted separately or conjointly as desired, and characterized by the provision of a dynamoelectric machine having generator functions, as well as motor functions whereby such dynamoelectric machine may be utilized as a motor either for operating or driving the starting apparatus or as a generator such as a radio generator then driven by the said manual means, in order to provide electric current for the radio apparatus or wireless signals for the purpose of giving the location of the airplane and obtaining assistance in the event that the fuel supply of the airplane has become exhausted and no power can be derived from the engine for generating the necessary electric current. The present embodiment of my invention as herein shown and hereinafter described has been selected for the purpose of a clear and definite disclosure of my invention, but it will be understood that while I have shown a dynamoelectric machine having radio generator functions, such machine is not limited to that type or character nor to an alternating current type, but may be any desired type of generator capable of generating electric current for the desired purpose.

In the drawings, Figure 1 is a vertical section of my apparatus on an irregular section line showing the dynamoelectric machine in position in combination with the engine starting apparatus and showing the manual means at right angles to its normal position; Fig. 2 a detail view of certain of the parts shown in Fig. 1 but showing the declutched position of the hand clutch between the electric machine and the starting apparatus; Fig. 3 a section on the line 3—3 of Fig. 2; Fig. 4 an elevation of the hand clutch; Fig. 5 a bottom plan thereof; Fig. 6 a plan view of the inertia device or flywheel; Fig. 7 a diagram of suitable wiring which may be used in connection with my apparatus; Fig. 8 a view similar to Fig. 1 illustrating a modified construction whereby provision is made for reversing the direction of rotation of the dynamoelectric machine and reversing the electrical connections; Fig. 9 a diagram of the wiring for the apparatus of Fig. 8 and illustrating more particularly in diagram the reversing switch; Fig. 10 a view similar to Fig. 1 and illustrating a modified construction whereby the inertia flywheel is adapted to be eliminated; and Fig. 11 a section on the line 11—11 of Fig. 10 except that the plungers are withdrawn from the flywheel.

My engine starting apparatus comprises a drive including a driving member adapted to engage and crank a member of the engine to be started and means for actuating such driving member, and power means, such as a dynamoelectric machine, and manually operated means, such as hand cranking mechanism. By preference and as herein shown, such actuating means includes an inertia device, such as a rotatable flywheel, but in the broad aspect of my invention such device is not essential but is of advantage in the starting operation in storing up energy and also in the operation of the dynamo when driven as a generator, in order to maintain substantially constant speed thereof during the hand driving thereof. The power means and the manual means are here shown combined in the same apparatus and usable separately or conjointly if desired with respect to the engine starting operation, and such dynamo is capable of actuation by the manual means whenever it is necessary to have such dynamo generate current for any desired purpose. My invention may partake of different forms of embodiment or construction, and I will therefore describe the selected embodiment herein shown without intention of limitation thereto except as may be required by the nature of certain of the claims.

The drive or transmission includes the drive proper and reduction gearing. First describing the drive, the same is located within a main casing 1 which is suitably supported as by being detachably connected with the crank case 2 of the engine, a small portion of which is illustrated. Within a bushing 3 in the casing, there rotates a driving barrel 4 and a shell 5 concentrically arranged therewithin and providing an annular space to receive a yielding driving connection which is here in the form of friction clutch 6 composed of two sets of clutch plates splined respectively to the interior of the barrel and the exterior of the shell. The proper pressure for the plates is provided by a series of springs 7 located in such annular space and such pressure is regulated by the adjustable nut 8 screwing onto the outer end of the shell. The thrust of these springs tends to force the shell outwardly whereby the ring 9 clamps the plates together by forcing them against the ring 10 which bears against the annular internal flange 11 within the shell.

The shell 5 is provided with internal long lead threads 12 on which is threaded a screw shaft 13 constituting the main portion of the driving member whose other principal portion is a clutch member 14 that is adapted to engage the engine member, such as the corresponding clutch element 15 forming a part of or secured to a rotatable part of the engine, such as the crank shaft 16 thereof. The clutch element 14 is a disk having clutch jaws 17 adapted to engage complementary clutch jaws 18 on the engine member and provided with a hub or sleeve portion 19 which has a bearing fit within shell 5 and which is splined on the exterior of the screw shaft 13 whereby the clutch element 14 and such shaft 13 have a relative longitudinal movement of limited degree independent of each other. The clutch element 14 is held in its outward position with a yielding pressure by a coil spring 22 which bears at its outer end against the bottom of sleeve 19 and at its inner end against the bottom of a socket formed in the outer end of the screw shaft. The driving member is operated and controlled manually by a rod 23 which passes centrally through the driving member and the main supporting shaft 24 of the reduction gearing. This rod terminates in a handle 25 at a point exterior of the apparatus, in the present instance, being located adjacent the exterior of the casing of the manually operated means hereinafter described.

Next describing the reduction gearing, the same is contained within the main casing and a cover plate 1ª by which such gearing is supported and in which it has its bearings. A main stationary internal gear 29 is secured to the casing 1 and with the same meshes a series of planetary gears 31 journaled between two parallel plates 32 and 33 which are spaced apart by suitable lugs 34 and held together by screws 35. The inner plate 33 is connected with the driving barrel 4, in the present instance by being splined thereto. This plate 33 has a hub provided with longitudinal grooves adapted to receive oppositely extending pins 38 secured to shaft 24 whereby such shaft and plate are drivingly but detachably connected together.

The pinions or gears 31 mesh with a central pinion 39 here formed as a part of the hub 40 of a gear 41 mounted to rotate freely upon the shaft 24. This gear 41 meshes with a pinion 43 which is here formed upon the hub 44 of a bevel gear 45 which is mounted to rotate freely upon the shaft 46.

The right hand end of shaft 24 (Fig. 1) is journaled in bearings 48 in casing plate 1ª and extends therethrough and to such projecting end a bevel pinion 49 is secured. This pinion forms a part of the manual means and the same extends into a small casing 50 secured in suitable manner to plate 1ª. In addition, such manual means comprises a cranking shaft 52 extending extraneous of casing 50 and is thereat provided with suitable means such as the pins 53 for engagement with an ordinary hand crank. This shaft 52 is journaled in ball bearings 54 and held in proper position longitudinally by nut 55. The shaft 52 is provided at its inner end with a bevel pinion 57 meshing with the corresponding pinion 49.

Next describing the inertia device or means, the same comprises a flywheel and operating connections with the bevel gear 45 and with the prime mover which is here a dynamo, such inertia means being contained within and supported by a casing 58 which is detachably secured to the main casing 1 in suitable manner as by screws 59. The flywheel comprises a ring 60 having the predetermined desired mass or weight, a web 61, and a hub 62. This hub is drivingly secured as by splining to a vertical shaft 63 which is journaled in bearings 64 in the casing 58 and has a bevel pinion 63ª meshing with gear 45. The flywheel is held in proper position on its shaft and with respect to its bearings by a nut 65. The dynamoelectric machine is so constructed as to have generator and motor functions and the same includes a frame 150 which is detachably secured to the casing 58 in suitable manner as by the screws 151, fields 152, armature 153, commutator 154, and brushes 155 for its motoring function, and slip rings 156 and brushes 157 as is usual in alternating construction with respect to the generating function of the dynamo. The dynamo has an extended armature shaft 158 which is received in the socketed upper end of the shaft 63 which provides a bearing therefor. The means for automatically connecting and disconnecting the dynamo from the flywheel comprises a clamping member consisting of a shell or inverted cup 159 having a central screw threaded hub portion 160 which is threaded upon the screw threads 161 formed integrally upon or separate from and applied to the armature shaft intermediate its extending length. Preferably a light spring 162 is interposed between said clamping member and the web of the flywheel tending to hold such member in its normal or unclamping position shown in Fig. 1.

Manually operated clutching means are provided for connecting and disconnecting the dynamo from the flywheel at the will of the operator, such means comprising in the present instance a shell or inverted cup 163 having parallel peripheral flanges 164 to receive the yoke 165 of a shipper device which also includes the vertically extended hand operated rod 166. This shell is provided with a series of depending pins 167 which are adapted to engage certain of the considerable number of holes 168 in the web of the flywheel according to whichever ones are presented to such pins and engaged thereby when such shell is moved downwardly by the operator. This shell is mounted upon the armature shaft 158 for longitudinal movement thereof and for rotary movement therewith—in the present instance by the provision of the splines 169 on the armature shaft and corresponding grooves 170 in the hub of such shell. Consequently, the shell 163 partakes of the rotation of the armature shaft and is also movable axially or longitudinally thereof as operated and controlled by the rod 166. This rod extends upwardly through the peripheral flange of the frame 150 and is associated with a hand operated spring pressed locking rod 170 whose inner end is adapted to be projected into one or the other of the two grooves 171 and 172 on such rod. According to Fig. 1, the shell 163 is in its clutching or engaged position with respect to the flywheel and the rod 170 which is now in the upper groove 172 holds such clutch in engaged position. When it is desired to disengage the clutch, the operator withdraws the locking rod 170 and raises the rod 166 whereupon the rod 170 will engage the lower groove 171 and hold the clutch in disengaged position as illustrated in Fig. 2.

In Fig. 7, there is shown a diagram of wiring suitable for the apparatus herein shown according to which M and RG represent the dynamo with motor functions and radio generator function, S represents a switch, B represents a storage battery, G represents a generator driven by the engine for charging the battery (such generator being not otherwise shown), C represents the condenser, IC represents the induction coils, A represents the antennæ or aerial and GAP represents the usual gap, the several grounds being indicated in the usual conventional manner.

Describing a cycle of operation of my engine starting apparatus and beginning first with utilization of the power means, that is the motoring function of the dynamo as the source of energy and with the parts in their normal position shown in Fig. 1 but with the exception that the clutch member 163 is in disengaged position as shown in Fig. 2, when the dynamo is energized by closing the switch S and the current thereby drawn from the battery B, the dynamo is operated as a motor and the armature shaft is rapidly rotated. The clamping member 159 will be automatically moved downwardly into clamping and driving engagement with the web 61 of the flywheel whereby such flywheel will partake of the rotation of the electric motor. This flywheel being drivingly connected with the shaft 63, the latter together with the gearing and transmission mechanism will be rotated. When the R. P. M. of the flywheel reaches a predetermined figure, such as in practice with respect to airplane engines from 15,000 to 20,000, the current may if desired be switched off from the dynamo and thereupon the rod 23 is manually moved inwardly, that is to the left in Fig. 1 and the screw shaft and its clutch element 14 are moved longitudinally and such clutch element is brought into engagement with the other clutch element 15 and the engine is thereby cranked in view of the fact that such element 14 is being rotated through the drive or transmission by means of the flywheel in which very considerable energy has been stored up, and such rotation will continue so long as there is sufficient energy left in the flywheel for that purpose.

Describing in detail the transmission of torque from the shaft 63 through the reduction gearing and the drive proper, the rotation of the shaft 63 will rotate the gears 45 and 41 whereupon the central pinion 39 will be rotated, and consequently the planetary pinions 31. As a result, these latter pinions by reason of their meshing with the internal stationary gear 39 will cause the entire frame or cage 32—33 to be rotated. Inasmuch as plate 33 is drivingly connected to the driving barrel 4, the latter will be rotated, and consequently the nut 5 will be rotated through the medium of the friction clutch 6. Although, the screw shaft 13 is threaded to the now revolving nut 5, it will not advance longitudinally but will rotate with such shell, and consequently the clutch element 14 will likewise be rotated. However, at this time such clutch element is in normal position, that is out of engagement with clutch element 15, but when rod 23 is moved to the left as hereinbefore explained, the screw shaft will be moved longitudinally whereupon such clutch elements will be brought into engagement and the torque of the accumulated energy of the inertia means or flywheel will be transmitted to the engine to crank the same.

When the engine starts on its own power, the excess speed of rotation of the engine and its clutch element 15 will cause the screw shaft and its clutch element 14 to be retracted by the screw action between such shaft and its nut 5 and thereby become disengaged from the engine in automatic manner and be restored to the normal position shown in Fig. 1.

Next describing the mode of operation when the manual means is the source of energy, an ordinary hand crank is applied to the cranking shaft 52 and rotated by the operator until the flywheel reaches the desired or predetermined R. P. M. In this operation, the torque is transmitted from shaft 52, through pinions 57 and 49 to shaft 24 and thence through the frame of the planetary pinions 31 to the gears 40 and 45 and thence to the shaft 63 and finally to the fly-wheel 60. When the manual means is the source of energy, there will be no clamping action between the dynamo and the flywheel and by reason of the rotation of such flywheel by the manual means, the clamping cup 159 will be released by screw action and by the action of the spring 162 from any clamping engagement with the web of the flywheel. Consequently, the dynamo is disconnected from the flywheel and will thereupon remain idle. This is of advantage inasmuch as the considerable load occasioned by the pressure of the brushes, as well as any friction in the dynamo bearings is removed from the cranking operation. This load is considerable at the cranking shaft 52 owing to the fact that it is multiplied many times through the gearing described. The flywheel having now been rotated to the proper speed, the rod 23 is operated and the engine cranked in the same manner as above explained and the drive is restored to normal position in automatic manner when the engine operates under its own power in the same manner also as above explained.

Now assuming that in case of accident or forced landing of the airplane when my apparatus is so specifically utilized and the engine being incapable of driving the usual generator because of the disablement thereof or the exhaustion of fuel therefor, it is desired to utilize the dynamo as a generator for generating electric current for any purpose, such as signaling by radio or wireless, the operator engages the hand clutch 163 with the flywheel as shown in Fig. 1 and then rotates the cranking shaft 52 whereupon the dynamo will function as a generator and generate the desired electric current. This separate and independent clutch member 163 is required in the construction of Fig. 1 because as hereinbefore stated, the driving of the flywheel by the manual means automatically disconnects such flywheel from the dynamo, that is removes the clamping member 159 from its clamping or driving relation with such flywheel and therefore in order to meet the exigency of the situation which requires the driving of the dynamo by the manual means, it becomes necessary to provide the hand controlled clutch 163 which normally is in idle or disengaged position as shown in Fig. 2 and operated only in case of the stated emergency.

In Fig. 8, there is shown another construction modified by reason of the fact that the hand operated clutch 163 is omitted and provision made for rotating the manual means backwardly, and consequently rotating the dynamo armature backwardly for which purpose the dynamo connections are reversed by a suitable reversing switch. Otherwise, the construction is the same as that of Fig. 1. According to the construction in Fig. 8, the hand crank 173 is not the usual one which has the spiral slots for automatic disengagement, but is one having longitudinal slots 174 to engage the cranking shaft whereby such shaft may be rotated backwardly by the operator. This backward rotation of the apparatus including the flywheel causes the clamping shell 159 which has sufficient frictional contact with the flywheel to clamp the same and establish driving relation between the manual means and the dynamo whose armature is thereby rotated in a reverse direction. This necessitates a reversal of the electrical connections, a diagram of which including the reversing switch is shown in Fig. 9 in which $a$ represents the armature of the dynamo, F the fields, T the terminal and RS the reversing switch. When the manual means and the dynamo are thus rotated in reverse direction, the separate or hand clutch 163 of the construction of Fig. 1 is dispensed with and the automatic connecting device 159 between the dynamo and the flywheel is utilized and functions as a connecting means when the dynamo is operated in one direction as a motor and when such dynamo is rotated in a reverse direction as a generator by means of the reversely operated manual means.

In Figs. 10 and 11 is shown a construction modified as compared with Fig. 1 in that provision is made for the elimination of the inertia flywheel at the will of the operator. According to this construction, the hub of the flywheel instead of being at all times drivingly connected with the shaft is adapted to be connected and disconnected therefrom by manually controlled means. In the present instance, these means which consist of a series of radial plungers 175 sliding in radial openings 176 in the shaft 63 which normally tend to disconnect such flywheel from the shaft which is the preferred construction. These plungers are spring pressed by springs 177 in an inward direction so as to be withdrawn from the sockets 178 in the bore of the hub of the flywheel and to be projected into the central bore 179 of the shaft 63 in which slides the manually operated rod 180, the upper end of this rod and the adjacent ends of the plungers being beveled for proper cooperation and action. A lever 181 pivoted to the casing 1 and extending through the side thereof is operatively connected at its inner end with the lower ends of the rod 180 and at its outer end with the manually operated rod 182. A spring 183 acting on the lever 181 holds the parts including the rod 180 in the normal position shown in Fig. 10. In this position, the flywheel is connected with the apparatus, but whenever it is desired to disconnect the same therefrom, the rod 180 is pulled upwardly thereby lowering the rod 180 whereupon the springs 177 will withdraw the plungers 175 from the flywheel hub so that the flywheel will be operatively disconnected and will remain idle during the operation of the apparatus.

The manually operated clutch 163 and the connecting member 159 are the same in this construction as in Fig. 1, but the clutch 163 instead of engaging the flywheel is adapted to engage a plate 184 which functionally takes the place of the web of the flywheel, the same being splined to the shaft 63 the same as the flywheel in the construction of Fig. 1.

According to the construction of Fig. 10, the flywheel may be eliminated if desired during any of the hereinbefore described operations as may be found desirable or necessary.

I claim:

1. An engine starter apparatus including a member of the engine to be started, a drive having a driving member normally disconnected but adapted to be moved into engagement with and to crank the member of the engine to be started, means for actuating such driving member, manual means connected with said actuating means, and a dynamo operatively connectible with such actuating means to function as a motor to drive said actuating means and to function as a generator driven by said manual means.

2. An engine starter apparatus including a member of the engine to be started, a drive having a driving member adapted to engage and crank the member of the engine to be started, means for actuating such driving member, including an inertia device, manual means connected with said actuating means, and a dynamo which has electric motor and generator characteristics and which is operatively connectible with said actuating means to drive, as a motor, the actuating means and to be driven, as a generator, by said manual means.

3. An engine starter apparatus including a member of the engine to be started, a drive having a driving member adapted to engage and crank the member of the engine to be started, said driving member being out of engagement with the engine member during the normal operation of the latter, means for actuating such driving member, manual means connected with said actuating means, a dynamo which has electric motor and generator characteristics and which is operatively connectible with said actuating means, means for connecting such dynamo with the actuating means when such dynamo functions as a motor, and means for such operative connection of the dynamo when functioning as a generator and driven by the manual means.

4. An engine starter apparatus including a member of the engine to be started, a drive having a driving member adapted to engage and crank the member of the engine to be started, means for rotating such driving member, means for moving the driving member into engagement with the engine member, manual means connected with said actuating means, a dynamo which has electric motor and generator characteristics and which is operatively connectible with said actuating means, means for automatically connecting such dynamo with the actuating means when such dynamo functions as a motor, and separate means for such operative connection of the dynamo when functioning as a generator and driven by the manual means.

5. An engine starter apparatus including a member of the engine to be started, a drive having a driving member adapted to engage and crank the member of the engine to be started, means for actuating such driving member, manual means connected with said actuating means, a dynamo which has electric motor and generator characteristics and which is operatively connectible with said actuating means, means for automatically connecting such dynamo with the actuating means when such dynamo functions as a motor, and separate means for such operative connection of the dynamo when functioning as a generator and driven by the manual means, said separate means being manually operable.

6. An engine starter apparatus including a member of the engine to be started, a drive having a driving member adapted to engage and crank the member of the engine to be started, means for actuating such driving member, manual means connected with said actuating means, a dynamo which has electric motor and generator characteristics and which is operatively connectible with said actuating means, means for connecting such dynamo with the actuating means when such dynamo functions as a motor, and separate means for such operative connection of the dynamo when functioning as a generator and driven by the manual means, said separate means being manually operable.

7. An engine starter apparatus including a member of the engine to be started, a drive having a driving member adapted to engage and crank the member of the engine to be started, means for rotating such driving member, means for moving the driving member into engagement with the engine member, manual means connected with said actuating means, a dynamo which has electric motor and generator characteristics and which is operatively connectible with said actuating means, means which automatically connects such dynamo with said actuating means only when the dynamo functions as a motor and is the driver, and which automatically disconnects such dynamo therefrom, and means for such operative connection of the dynamo when functioning as a generator and driven by the manual means.

8. An engine starter apparatus including a member of the engine to be started, a drive having a driving member adapted to engage and crank the member of the engine to be started, means for actuating such driving member, manual means connected with said actuating means, a dynamo which has electric motor and generator characteristics and which is operatively connectible with said actuating means, means which automatically connects such dynamo with said actuating means only when the dynamo functions as a motor and is the driver, and which automatically disconnects such dynamo therefrom, and manually operated means for such operative connection of the dynamo when functioning as a generator and driven by the manual means.

9. An engine starter apparatus including a member of the engine to be started, a drive having a driving member adapted to engage and crank the member of the engine to be started, means for actuating such driving member, including an inertia device, manual means connected with said actuating means, a dynamo which has electric motor and generator characteristics and which is operatively connectible with said actuating means, means which is adapted to connect such dynamo with the inertia device when the dynamo functions as a motor, and means which is adapted to connect such dynamo with the inertia device when the dynamo is driven by the manual means and then functions as a generator.

10. An engine starter apparatus including a member of the engine to be started, a drive having a driving member adapted to engage and crank the member of the engine to be started, means for actuating such driving member, including an inertia device, manual means connected with said actuating means, a dynamo which has electric motor and generator characteristics and which is operatively connectible with said actuating means, normally-disconnected means operable to connect such dynamo with the inertia device for functioning as a motor, and means which is adapted to connect such dynamo with the inertia device when the dynamo is driven by the manual means and then functions as a generator.

11. An engine starter apparatus including a member of the engine to be started, a drive having a driving member adapted to engage and crank the member of the engine to be started, means for actuating such driving member, including an inertia device, manual means connected with said actuating means, a dynamo which has electric motor and generator characteristics and which is operatively connectible with said actuating means, means which normally disconnects such dynamo from the inertia device but connects the same when the dynamo functions as a motor, and manually operable means for connecting such dynamo with the inertia device when the dynamo is driven by the manual means and then functions as a generator.

12. An engine starter apparatus including a member of the engine to be started, a drive having a driving member adapted to engage and crank the member of the engine to be started, means for actuating such driving member, including an inertia device in the form of a flywheel, manual means operatively connected with said actuating means, a dynamo having motor and generator characteristics, and two separate connecting means for operatively connecting the dynamo with the flywheel, the first of said means adapted to provide such connection when the dynamo functions as a motor, and the second of said means adapted to provide that connection when the dynamo is driven by the manual means and therefore functions as a generator.

13. An engine starter apparatus including a member of the engine to be started, a drive having a driving member adapted to engage and crank the member of the engine to be started, means for actuating such driving member, including an inertia device in the form of a flywheel having a rim, hub and intervening web, the actuating means including other parts, said hub being connected with the other parts, manual means operatively connected with the actuating means, a dynamo having motor and generator characteristics, and two separate means for operatively connecting the dynamo with the web of the flywheel, the first of said means adapted to provide such connection when the dynamo functions as a motor and the second of said means adapted to provide that connection when the dynamo is driven by the manual means and therefore functions as a generator.

14. An engine starter apparatus including a member of the engine to be started, a drive having a driving member adapted to engage and crank the member of the engine to be started, means for actuating such driving member, including an inertia device in the form of a flywheel, manual means having operative engagement with said actuating means, a dynamo having motor and generator characteristics, and two separate connecting means for operatively connecting the dynamo with the flywheel, the first of said means normally automatically disconnecting such dynamo from the flywheel but automatically connecting the same therewith when the dynamo functions as a motor, and the second of said means normally disconnecting such dynamo from the flywheel but adapted to connect the same therewith at the will of the operator when the dynamo is driven by the manual means and then functions as a generator.

15. An engine starter apparatus including a member of the engine to be started, a drive having a driving member adapted to engage and crank the member of the engine to be started, means for actuating such driving member, including an inertia device in the form of a flywheel, manual means connected to said actuating means, a dynamo having motor and generator characteristics, and two separate connecting means for operatively connecting the dynamo with the flywheel, the first of said means automatically connecting the dynamo with the flywheel when such dynamo functions as a motor, and the second of said means being a manually operable clutch operated to provide said connection between the dynamo and flywheel when the dynamo is to be driven by the manual means and then functions as a generator.

16. An engine starter apparatus including a member of the engine to be started, a drive having a driving member adapted to engage and crank the member of the engine to be started, means for actuating such driving member, including an inertia device in the form of a flywheel having a rim, hub and intervening web, the actuating means including other parts, said hub being connected with the other parts, manual means drivably connected to the actuating means, a dynamo having both motor and generator characteristics, and two separate means for operatively connecting the dynamo with the web of the flywheel, the first of said means normally automatically disconnecting such dynamo from said web but automatically connecting the same therewith when the dynamo functions as a motor, and the second of said means being a clutch normally disconnecting such dynamo from said web but adapted to connect the same therewith at the will of the operator when the dynamo is to be driven by the manual means and then functions as a generator.

17. An engine starter apparatus including a member of the engine to be started, a drive having a driving member adapted to engage and crank the member of the engine to be started, means for actuating such driving member, including an inertia device in the form of a flywheel having a rim, hub and intervening web, the actuating means including other parts, said hub being connected with the other parts, manually operable means connected to the actuating means, a dynamo having motor and generator characteristics, and two separate means for operatively connecting the dynamo with the web of the flywheel, the first of said means normally automatically disconnecting such dynamo from said web but automatically connecting the same therewith when the dynamo functions as a motor, and the second of said means being a clutch normally disconnecting such dynamo from said web but adapted to connect the same therewith at the will of the operator when the dynamo is to be driven by the manual means and then functions as a generator, said dynamo having an armature shaft and said clutch including a member rotated by and mounted to slide axially upon said shaft into operative engagement with said web.

18. An engine starter apparatus including a member of the engine to be started, a drive having a driving member adapted to engage and crank the member of the engine to be started, means for actuating such driving member, including an inertia device in the form of a flywheel having a rim, hub and intervening web, the actuating means including other parts, said hub being connected with the other parts, manually operable means connected to the actuating means, a dynamo having motor and generator characteristics, and two separate means for operatively connecting the dynamo with the web of the flywheel, the first of said means normally automatically disconnecting such dynamo from said web but automatically connecting the same therewith when the dynamo functions as a motor, and the second of said means being a clutch normally disconnecting such dynamo from said web but adapted to connect the same therewith at the will of the operator when the dynamo is to be driven by the manual means and then functions as a generator, said dynamo having an armature shaft and said web having a series of holes, and said clutch including a rotary and axially movable member rotated by and mounted to slide axially upon said shaft and having a series of pins to engage said holes when such member is moved axially in the direction of said web.

19. An engine starter apparatus including a member of the engine to be started, a drive having a driving member adapted to engage and crank the member of the engine to be started, means for actuating such driving member, including an inertia device in the form of a flywheel having a rim, hub and intervening web, the actuating means including other parts, said hub being connected with the other parts, manually operable means connected to the actuating means, a dynamo having motor and generator characteristics, and two separate means for operatively connecting the dynamo with the web of the flywheel, the first of said means normally automatically disconnecting such dynamo from said web but automatically connecting the same therewith when the dynamo functions as a motor, and the second of said means being a clutch normally disconnecting such dynamo from said web but adapted to connect the same therewith at the will of the operator when the dynamo is to be driven by the manual means and then functions as a generator, said dynamo having an armature shaft and said clutch including a shell having a hub rotated by and mounted to slide axially upon said shaft into operative engagement with said web, and a manually operated shifter cooperating with said shell.

20. An engine starter apparatus including a member of the engine to be started, a drive having a driving member adapted to engage and crank the member of the engine to be started, means for actuating such driving member, including an inertia device in the form of a flywheel having a rim, hub and intervening web, the actuating means including other parts, said hub being connected with the other parts, manually operable means connected to the actuating means, a dynamo having motor and generator characteristics, and two separate means for operatively connecting the dynamo with the web of the flywheel, the first of said means normally automatically disconnecting such dynamo from said web but automatically connecting the same therewith when the dynamo functions as a motor, and the second of said means being a clutch normally disconnecting such dynamo from said web but adapted to connect the same therewith at the will of the operator when the dynamo is to be driven by the manual means and then functions as a generator, said dynamo having an armature shaft and said clutch including a member rotated by and mounted to slide axially upon said shaft into operative engagement with said web, and means for locking said clutch in normal disengaged position.

21. An engine starter apparatus including a member of the engine to be started, a drive having a driving member adapted to engage and crank the member of the engine to be started, means for actuating such driving member, an inertia device normally connected to the actuating means, said actuating means being operable without said inertia device, and means for disconnecting said device from said actuating means.

22. An engine starter apparatus including a member of the engine to be started, a drive having a driving member adapted to engage and crank the member of the engine to be started, means for actuating such driving member, a flywheel normally connected to the actuating means, said actuating means being operable without said flywheel, and manually operated means for disconnecting such flywheel from said actuating means and rendering it inoperative.

23. An engine starter apparatus including a member of the engine to be started, a drive having a driving member adapted to engage and crank the member of the engine to be started, means for actuating such driving member, an inertia device normally connected to the actuating means, means for disconnecting such inertia device from the actuating means, in combination with manual means and with a dynamo operatively connectible with such actuating means and adapted to function as a motor to drive said actuating means and to function as a generator and to be driven by said manual means.

24. An engine starter apparatus including a member of the engine to be started, a drive having a driving member adapted to engage and crank the member of the engine to be started, means for actuating such driving member including a rotatable shaft and an inertia device independent of the engine to be started adapted to be operatively connected therewith, and a connecting member under the control of the operator for connecting and disconnecting said shaft and inertia device, said connecting member being normally in connecting position.

25. An engine starter apparatus including a member of the engine to be started, a drive having a driving member adapted to engage and crank the member of the engine to be started, means for actuating such driving member including a rotatable shaft and an inertia device adapted to be operatively connected therewith, and a connecting member under the control of the operator for connecting and disconnecting said shaft and inertia device, said device being in the form of a flywheel having a hub fitting upon said shaft and said connecting member including a radially movable pin mounted in and adapted to project from the shaft and to engage said hub, means tending to hold the pin in disengaged position, and means for controlling the position of said pin and normally holding the same in engaged position.

26. An engine starter apparatus including a member of the engine to be started, a drive having a driving member adapted to engage and crank the member of the engine to be started, means for actuating such driving member including a rotatable shaft and an inertia device adapted to be operatively connected therewith, and a connecting member under the control of the operator for connecting and disconnecting said shaft and inertia device, said device being in the form of a flywheel having a hub fitting upon said shaft and said connecting member including a radially movable pin mounted in and adapted to project from the shaft and to engage said hub, said pin being spring-pressed towards disengaged position and said shaft having a central bore into which such pin is adapted to project, and a manually operated rod in said bore for controlling said pin and adapted to force the same into engaged position or to permit it to assume disengaged position.

27. An engine starter apparatus including a member of the engine to be started, a drive having a driving member adapted to engage and crank the member of the engine to be started, means for actuating such driving member including an inertia device and a shaft having driving engagement with the inertia device, means for disconnecting such device from said shaft, in combination with an electric machine adapted to be connected with said shaft to drive such actuating means, and means for operatively connecting said machine with said shaft.

28. An engine starter apparatus including a member of the engine to be started, a drive having a driving member adapted to engage and crank the member of the engine to be started, means for actuating such driving member including an inertia device and a shaft having driving engagement with the inertia device, means for disconnecting such device and shaft, in combination with an electric machine adapted to be connected with said shaft to drive such actuating means, and automatic means for operatively connecting said machine with said shaft when the machine is operated.

29. An engine starter apparatus including a member of the engine to be started, a drive having a driving member adapted to engage and crank the member of the engine to be started, means for actuating such driving member including an inertia device and a shaft operatively connected to the inertia device, means for disconnecting such device from the shaft, in combination with an electric machine adapted to be connected with said shaft to drive such actuating means and having motor and generator functions, means for operatively connecting said machine with said shaft when it functions as a motor, manually operated means operatively connected with said actuating means and means for operatively connecting said machine with said shaft when said manually operated means are operated.

30. An engine starter apparatus including a member of the engine to be started, a drive having a driving member adapted to engage and crank the member of the engine to be started, means for actuating such driving member including an inertia device and a shaft drivably connected to said device, means for disconnecting such device from said shaft, in combination with an electric machine adapted to be connected with said shaft to drive such actuating means, and having motor and generator functions, said shaft having a bearing socket at one end and said machine having an armature shaft bearing in said socket, a connecting member for connecting the machine with said shaft when it functions as a motor, a clutch device for connecting the shaft with the machine when it functions as a generator, and manually operated means operatively connected with said actuating means for actuating the starter apparatus and driving said machine.

31. An engine starter apparatus including a member of the engine to be started, a drive having a driving member adapted to engage and crank the member of the engine to be started, means for actuating such driving member including an inertia device, manual means connected with said actuating means, a dynamo which has electric motor and generator characteristics and which is operatively connectible with said actuating means, means which is adapted to connect such dynamo with the actuating means when the dynamo functions as a motor, and means which is adapted to connect such dynamo with the actuating means when such dynamo is driven by the manual means and then functions as a generator, and means for disconnecting the inertia device from the actuating means at the will of the operator.

32. An engine starter apparatus including a member of the engine to be started, a drive having a driving member adapted to engage and crank the member of the engine to be started, means for actuating such driving member including an inertia device, manual means connected with said actuating means, a dynamo which has electric motor and generator characteristics and which is operatively connectible with said actuating means, means which is adapted to connect such dynamo with the actuating means when the dynamo functions as a motor, and means which is adapted to connect such dynamo with the actuating means when such dynamo is driven by the manual means and then functions as a generator, and manually operated means for disconnecting the inertia device from the actuating means.

33. An engine starter apparatus including a member of the engine to be started, a drive having a driving member adapted to engage and crank the member of the engine to be started, means for actuating such driving member including an inertia device, manual means connected with said actuating means, a dynamo which has electric motor and generator characteristics and which is operatively connectible with said actuating means, means which is adapted to connect such dynamo with the actuating means when the dynamo functions as a motor, and means which is adapted to connect such dynamo with the actuating means when such dynamo is driven by the manual means and then functions as a generator, and means normally connecting the inertia device with the actuating means but adapted to disconnect them at the will of the operator.

In testimony whereof, I have subscribed my name.

CHARLES MARCUS.